Feb. 10, 1953

G. V. A. MALMROS ET AL

2,627,924

CARD PUNCHING MACHINE

Filed May 28, 1949

Inventors
GUSTAV V. A. MALMROS
EDMUND A. BARBER, JR.
JOHN R. ENGSTROM
BY Ralph C. Dustin
Attorney Feb. 10, 1953  G. V. A. MALMROS ET AL  2,627,924
CARD PUNCHING MACHINE
Filed May 28, 1949  9 Sheets-Sheet 3

INVENTORS
GUSTAV V. A. MALMROS
EDMUND A. BARBER, JR.
JOHN R. ENGSTROM
BY Ralph C. Dustin
ATTORNEY Feb. 10, 1953     G. V. A. MALMROS ET AL     2,627,924
CARD PUNCHING MACHINE
Filed May 28, 1949     9 Sheets-Sheet 5

INVENTORS
GUSTAV V. A. MALMROS
EDMUND A. BARBER, JR.
JOHN R. ENGSTROM
BY Ralph C. Dustin
ATTORNEY

INVENTORS
GUSTAV V. A. MALMROS
EDMUND A. BARBER, JR.
JOHN R. ENGSTROM
BY Ralph C. Dustin
ATTORNEY Patented Feb. 10, 1953

2,627,924

UNITED STATES PATENT OFFICE 2,627,924

CARD PUNCHING MACHINE

Gustav V. A. Malmros, Binghamton, Edmund A. Barber, Jr., Johnson City, and John R. Engstrom, Endicott, N. Y., assignors to International Business Machines Corporation, New York, N. Y., a corporation of New York Application May 28, 1949, Serial No. 95,934

8 Claims. (Cl. 164—113)

This invention relates to punching machines and, more particularly, to machines that are adapted to punch holes successively in different columns of a card and to eject the card into a hopper after the punching operations have been completed.

In punching machines of this type there is usually provided a bail which is adapted to be moved into engagement with interposers for effecting the operation of punch pins. The bail is connected by links and levers to the armature of a magnet which is energized as the interposers complete their movement under the bail. Some clearance must be provided between the bail and the interposers so that the latter may be moved without obstruction to their punching positions. Movement of the bail into engagement with the interposers and movement of the armature into engagement with an abutment as the bail is returned to its retracted position must necessarily produce considerable noise. Such mechanism is also comparatively heavy and slow in its operation.

By providing a continuously rotating cam in place of the bail and yieldingly supporting pins in engagement with the cam at points to act against the interposers when they are moved to punching positions, a much quieter and faster operation may be obtained. In order that the interposers may be moved to their punching positions without interference by the cam operated pins, there may be provided an electrical operating means which is energized under the control of a commutator rotating with the cam. Other functions of the machine, such as spacing, skipping, etc., may be regulated by the commutator so that they take place at the proper times in the cycle of operation. To assure that the pins are actuated to punch the card, there may be provided contacts which are closed after predetermined movement of the pins, and advancement of the card to its next punching position may be made dependent upon the closing of such contacts.

An object of this invention is to provide an improved machine for punching holes in cards and depositing the cards when punched into a hopper.

Another object is to provide a punching machine having improved means for actuating punch pins so as to perforate a card.

A further object is to provide, in a punching machine, a mechanism which actuates punch pins quietly and at a high speed.

Yet another object is to provide a punching machine having a continuously rotating cam adapted to actuate punch pins after interposers are moved to their punching positions and including a commutator rotating with the cam for regulating the energizing of magnets so as to effect a movement of the interposers to their punching positions at the proper time.

Another object is to provide, in a machine for punching holes in different columns of a card, a continuously rotating cam for actuating punch pins when interposers have been moved to punching positions, and means operatively connected to the cam for controlling movement of the interposers and the operation of means for positioning the card under the punch pins.

Other objects of the invention will be pointed out in the following description and claims and illustrated in the accompanying drawings, which disclose, by way of example, the principle of the invention and the best mode, which has been contemplated, of applying that principle.

Figure 1:
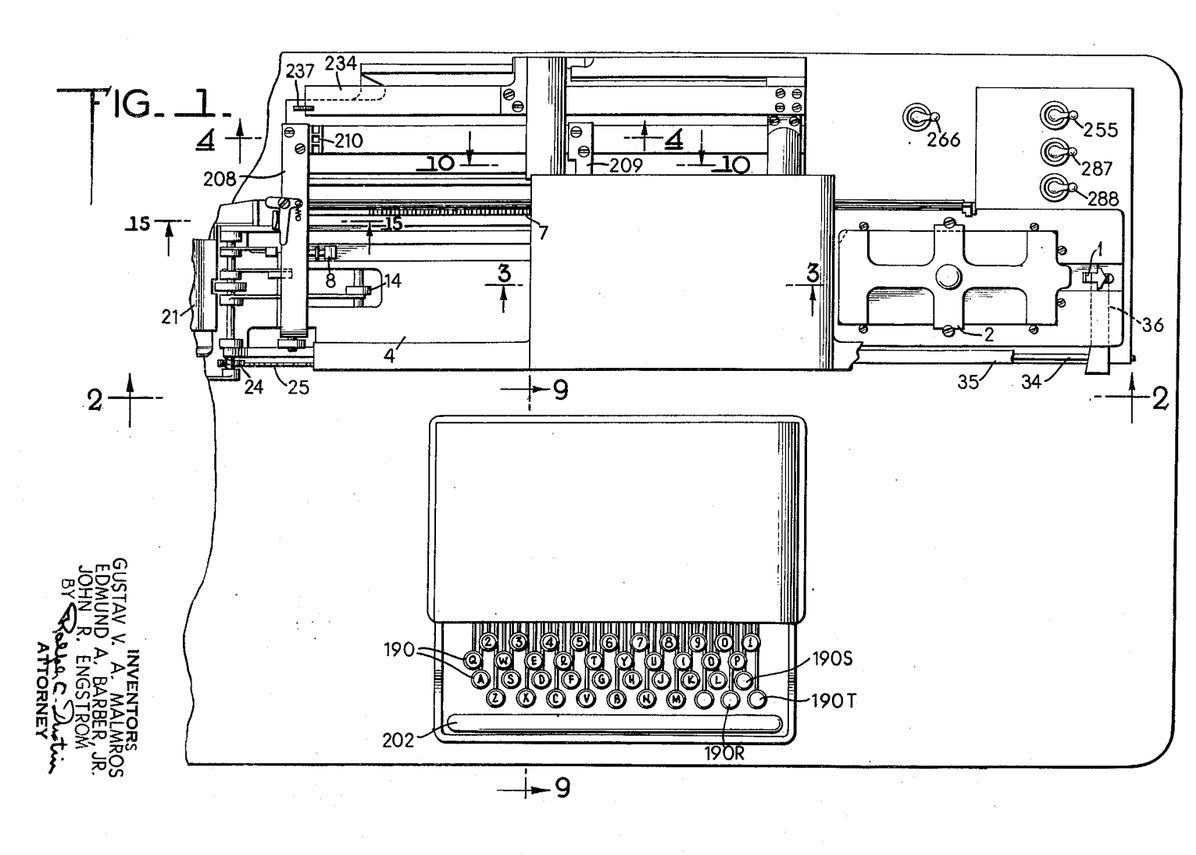
Fig. 1 is a plan view of the improved punching machine.
Figure 2:
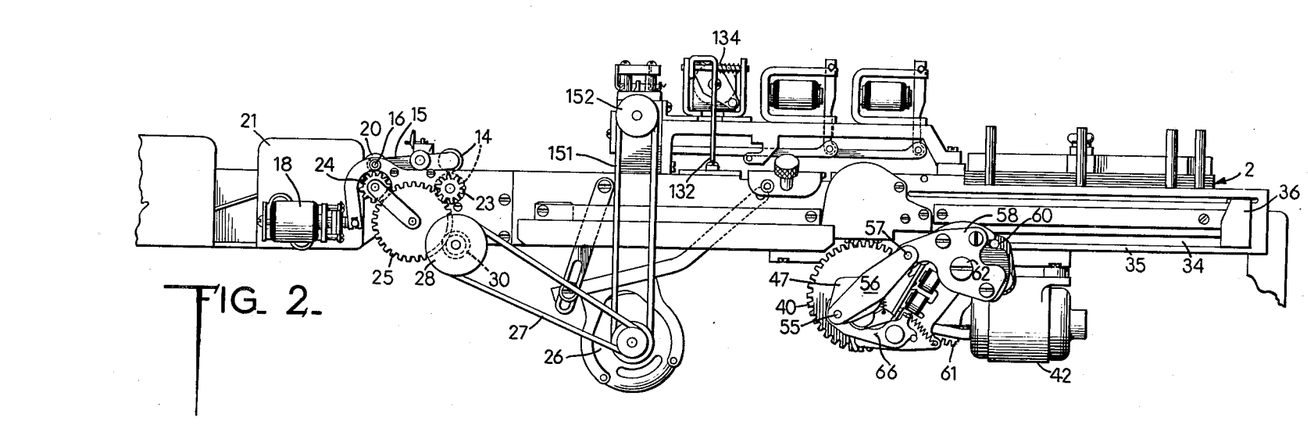
Fig. 2 is a front elevational view of the punching machine taken on the line 2—2 of Fig. 1 and with a cover for a portion of the operating mechanism removed.
Figure 3:
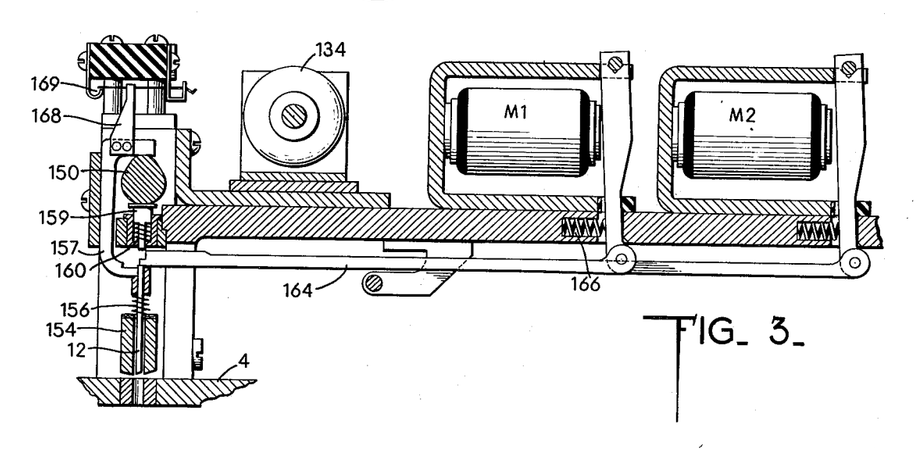
Fig. 3 is an enlarged vertical sectional view taken on the plane of the line 3—3 of Fig. 1.

Referring to the drawings, and more particularly to Figs. 1 and 2, it will be noted that the improved punching machine includes, in general, a picker 1 which is operable to advance cards singly from the bottom of a card stack in a hopper 2 to the left along the surface of a plate 4. As a card is advanced to the left, it passes under a flexible member 6 (Fig. 5) carried by a rack 7. Fixed to the rack at its left-hand end is a stop 8 (Fig. 1) for limiting the forward movement of the card. When the card engages the stop 8, the member 6 snaps down behind the trailing edge of the card and serves as a pusher for advancing the card upon movement of the rack to the left. Mechanism to be described later is provided for moving the rack step-by-step so as to present columns on the card successively to a row of punch pins 12 (Fig. 3).

When the card has been moved to a point where its last column is presented to the punch pins, the forward edge of the card extends between a pair of feed rolls 14 (Fig. 2), the upper one of which is carried by a lever 15 pivotally supported at 16 and operatively connected at one end to the plunger of a solenoid 18. The lever is normally held in a position so that the upper feed roll 14 is free of the lower feed roll, but an energizing of the solenoid causes the lever to rock in a clockwise direction and engage the feed rolls with the card for advancing it to the left. Another pair of feed rolls 20 are arranged in a position to receive the card from the feed rolls 14 and to advance it to a stacker mechanism (not shown) in a hopper 21. Fixed to the lower feed rolls 14 and 20 are gears 23 and 24 meshing with a gear 25 which is driven continuously by a motor 26 through a belt 27 and a pulley 28 carrying a gear 30 meshing with the gear 25. The mechanism for ejecting and stacking the cards in the hopper 21 forms the subject matter of a patent application of Edmund A. Barber, Jr., filed May 28, 1949, Serial No. 95,936.

For reciprocating the picker 1 there is provided a bar 34 guided for reciprocation in a channel 35 and having a laterally extending arm 36 operatively connected to the picker. At the left-hand end of the bar 34 is a rack portion 38 (Fig. 6) having teeth at its lower edge engaging a gear 40 which is loosely mounted upon a shaft 41 rotatably supported by the frame of the punching machine. The shaft 41 is driven by a motor 42 (Fig. 2) in a counter-clockwise direction through suitable gearing (not shown), and fixed to the shaft is a ratchet 43 having teeth which are adapted to be engaged by a tooth 44 on a dog 45. A plate 47 is freely mounted upon the front end of the shaft 41, and fixed to the plate is a pin 48 upon which the dog is pivotally mounted. Arranged adjacent to the gear 40 is a magnet 50 having an armature 51 which normally engages the right-hand end of the dog 45 for holding the tooth 44 out of engagement with the ratchet 43. When the magnet 50 is energized, the armature 51 is moved to a position for releasing the dog so that the latter may be moved by a spring 52 into engagement with the ratchet for effecting rotation of the plate 47 in a counter-clockwise direction.

Fixed to the plate 47, as shown in Fig. 2, is a pin 55 to which one end of a link 56 is pivotally connected, and the opposite end of the link is pivoted at 57 to a member 58 having a pin and slot connection 60 with a gear sector 61 pivotally supported at 62. The gear sector 61 meshes with a gear 64 (Fig. 6) which is fixed for rotation with the gear 40. As the plate 47 makes one complete rotation from its home position in Fig. 2, the gear sector 61 is actuated through the link 56 and the member 58 to rotate the gear 40 first in a counter-clockwise direction and then in a clockwise direction. When the plate 47 reaches its home position, a detenting lever 66 (Fig. 2) engages the pin 55 and yieldingly holds the parts against movement.

Figures 6, 7:
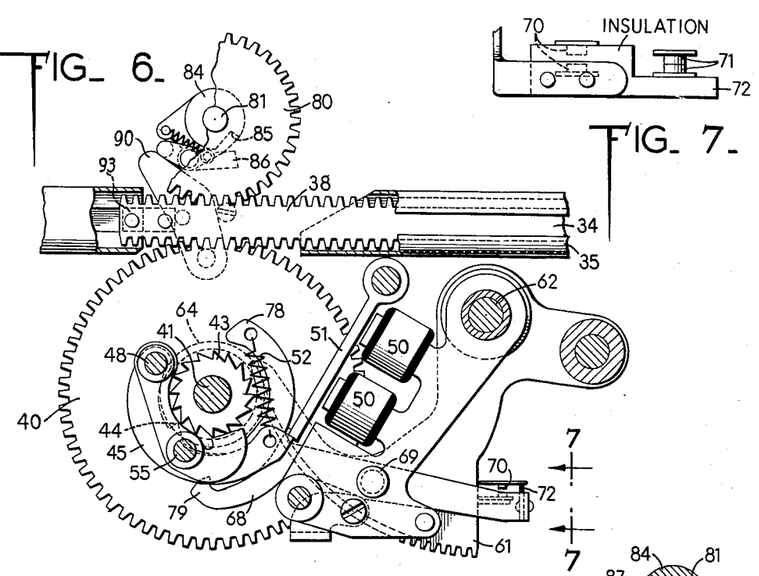
Fig. 6 is an enlarged vertical sectional view of the feed control mechanism shown in Fig. 2.
Fig. 7 is an enlarged elevational view taken on the plane of the line 7—7 of Fig. 6.

Arranged below the magnet 50, as shown in Fig. 6, is a lever 68 pivotally supported at 69 for controlling the operation of two pairs of contacts 70 and 71. The armature 51 normally engages the lever and holds it in a position so that the contacts 70 are held open and the contacts 71 are held closed through an insulating member 72 engaging blades of the contacts. When the armature is attracted to the magnet 50, the lever 68 is released and the tension of the contact blades swings the lever in a clockwise direction to effect a closing of the contacts 70 and an opening of the contacts 71. The contacts 70 are connected (as shown in the wiring diagram of Fig. 17c) in a circuit for controlling the operation of the motor 42. A continuous circuit is provided for the motor 42 through a resistance 75, and the contacts 70 operate when closed to short-circuit the resistance 75 for effecting operation of the motor 42 at a high speed.

When the magnet 50 is energized to attract the armature 51, the dog 45 is released so that the tooth 44 engages the ratchet 43, and the lever 68 is released to permit a closing of the contacts 70. The motor then operates at a high speed to drive the gear 40 in a counter-clockwise direction through the ratchet 43, the dog 45 and the mechanism for operating the gear sector 61, as described above. As soon as the rotation of the gear 40 in a counter-clockwise direction has been completed, a finger 78 carried by the plate 47 engages a projecting portion 79 on the lever 68 for swinging the latter in a counter-clockwise direction to open the contacts 70. The motor 42 is then energized through the resistance 75 to effect its operation at a slow speed while the gear 40 is rotated in a clockwise direction to return the picker to a position for engaging the next card.

Shortly after the magnet 50 has been energized, it is then deenergized, as will be described later, and its armature returns to a position for engaging the free end of the dog 45 after one complete rotation of the plate 47 has been effected. The lever 68 is returned by the finger 78 to a position for engagement by the armature 51 so that the contacts 70 are held open until the magnet 50 is energized once more. It will be appreciated that the motor will continue to operate at low speed as long as the contacts 70 are held open, but the driving of the gear 40 is discontinued as soon as the dog is moved out of engagement with the ratchet 43.

Figures 10, 11, 12, 13, 14:
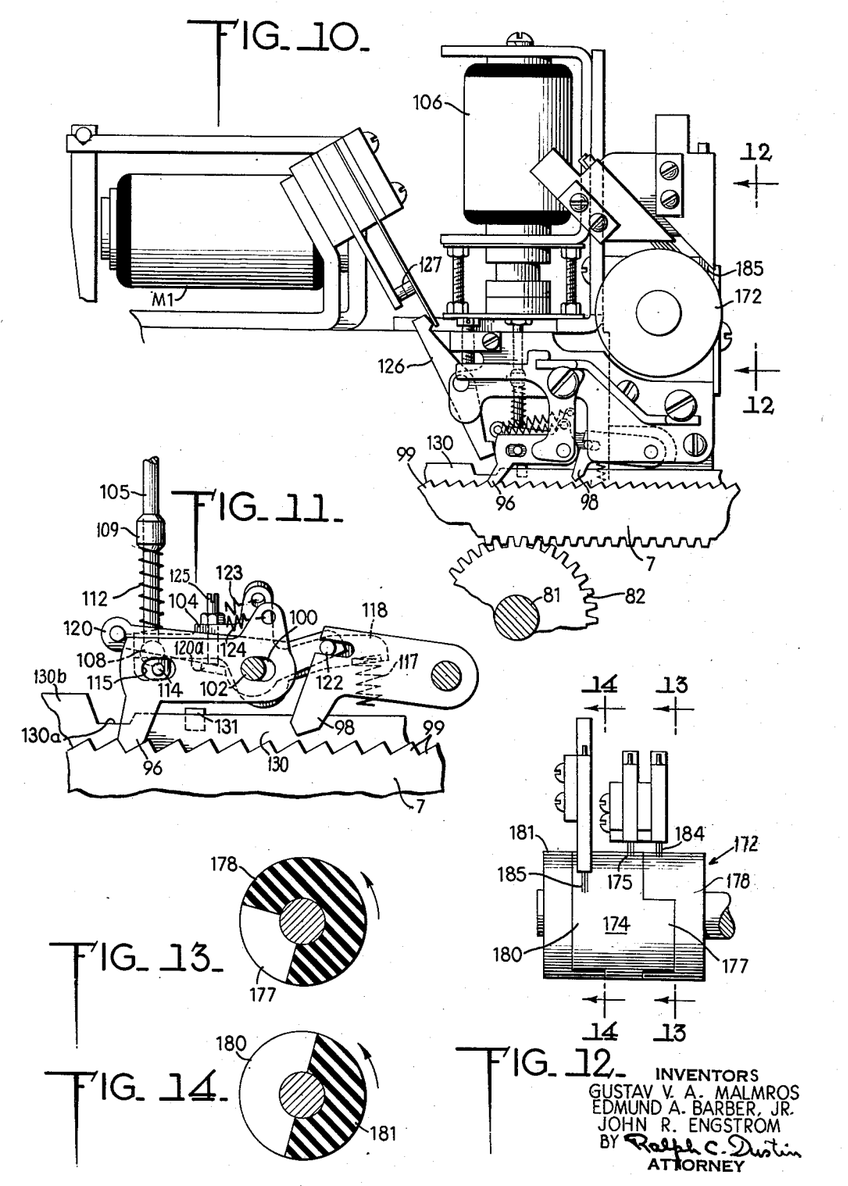
Fig. 10 is an enlarged elevational view of the escapment mechanism and the commutator taken on the plane of the line 10—10 of Fig. 1.
Fig. 11 is an enlarged elevational view of a portion of the escapement mechanism shown in Fig. 10.
Fig. 12 is an elevational view of the commutator taken on the plane of the line 12—12 of Fig. 10.
Figs. 13 and 14 are vertical sectional views taken on the planes of the lines 13—13 and 14—14, respectively, of Fig. 12.

While the picker 1 is moved to the left, the rack 7 is moved to the right in Fig. 1 so that the card may be positioned between the front stop 8 and the pusher 6 with the first column of the card arranged under the row of punch pins 12. For moving the rack 7 to the right, there is provided a gear 80 (Fig. 6) meshing with teeth at the upper edge of the rack 38 and freely mounted upon a shaft 81 journaled in the frame of the punching machine. Connected to the shaft 81, as shown in Fig. 10, is a gear 82 meshing with teeth along the lower edge of the rack 7. The shaft 81 is driven by the gear 80 through a clutch mechanism comprising a cam 84 fixed to the gear 80 and having a notch 85 adapted to receive a dog 86 pivotally supported by an arm 87 which is fixed to the shaft 81. A cam lever 90 is pivotally supported at 91 and is engageable with the dog 86 for moving the latter free of the notch 85. Attached to the left-hand end of the rack 38 is a block 93 which engages the lever 90 when the rack is moved to its extreme right-hand position, and the lever 90 is actuated by the block to swing the dog 86 out of engagement with the notch 85. Upon movement of the rack 38 to the left, the dog 86 is released to engage the notch 85 and effect rotation of the shaft 81 in a clockwise direction in Figs. 6 and 8. When the rack 38 is moved to the right by the gear 40, the gear 80 and the cam 84 are rotated in a counter-clockwise direction and the dog 86 rides freely on the surface of the cam until the block 93 engages the lever 90 for moving the dog to its released position. The mechanism for actuating the picker and the card rack is similar to that disclosed by the Brand et al. Patent No. 2,333,461, and further description herein is believed to be unnecessary.

*Escapement mechanism*

The rack 7 is urged to the left in Fig. 1 or to the right in Fig. 10 by a suitable yielding means (not shown), and its movement is controlled by an escapement mechanism comprising a stepping pawl 96 and a holding pawl 98 (Figs. 10 and 11) which coact with teeth 99 at the upper edge of the rack 7. The stepping pawl 96 is provided with an elongated slot 100 through which a pin 102 freely extends. A member 104 is pivotally mounted upon the pin 102 and is operatively connected through a rod 105 to the plunger of a solenoid 106. The rod 105 has an enlarged rounded end 108 fitting in a socket at the lower side of a flange portion on the member 104, and a spring 112 acts between a collar 109 on the rod and the member 104 for holding the latter against the end 108. Fixed to the member 104 is a pin 114 extending through a slot 115 in the stepping pawl 96, and this pin operates to lift the pawl out of engagement with the teeth 99 when the member 104 is rocked in a clockwise direction by an energizing of the solenoid 106. A spring 117 acts against a projecting portion 118 of the member 104 for urging it to a position which permits engagement of the pawl with the teeth 99. Pivotally mounted upon the pin 102 is another member 120 carrying a pin 122 which extends into a notch in the holding pawl 98 for positioning it relative to the teeth 99. The member 120 is connected by a spring 123 to the member 104 so that it is yieldingly moved with the member in a clockwise direction. A spring 124 connects the stepping pawl 96 to the member 120 to effect a movement of the pawl to the left after it is disengaged from the teeth 99. A flange portion 120a on the member 120 is engageable with an adjustable pin 125 carried by the member 104 for limiting upward movement of the member 120 relative to the member 104.

When the solenoid 106 is energized, the member 104 is rocked in a clockwise direction and the member 120 is rocked with it until the holding pawl engages the rack 7. After the holding pawl is positioned for engagement by a tooth 99, the member 104 operates through the pin 114 to lift the stepping pawl 96. The spring 124 then moves the stepping pawl to the left for engagement by the next tooth 99 when the rack 7 moves to the right upon a lifting of the holding pawl. As the stepping pawl is moved to the left it engages a lever 126 (Fig. 10) and rocks the latter to open a pair of normally closed contacts 127. A deenergizing of the solenoid 106 results in a rocking of the member 104 in a counter-clockwise direction to drop the stepping pawl first and then to raise the holding pawl. The rack 7 is moved by the yielding means (not shown) as soon as the holding pawl is raised, and the stepping pawl is engaged by the next tooth 99 and is carried with the rack 7 until the pin 102 engages the end of the slot 100. Upon movement of the stepping pawl to the right in Fig. 10, the contacts 127 return to their closed positions. The movement of the rack is such that the card is advanced one column under the punch pins 12.

Figures 8, 9:
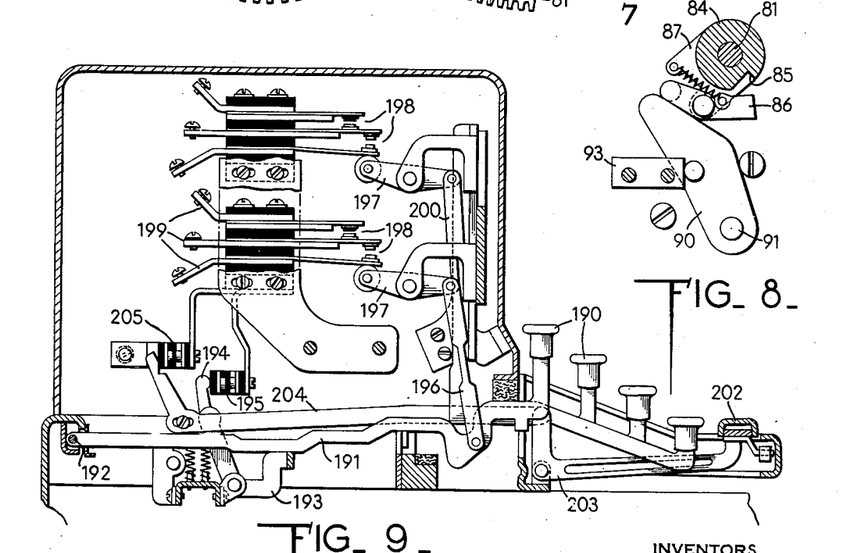
Fig. 8 is an enlarged sectional view showing a portion of the feed control mechanism in Fig. 6.
Fig. 9 is an enlarged vertical sectional view taken on the plane of the line 9—9 of Fig. 1.

It will be appreciated that the movement of the rack 7 under the control of the escapement mechanism results in a driving of the shaft 81 in a counter-clockwise direction in Fig. 8. Since the dog 86 is fixed to the shaft 81 through the arm 87, it must also swing in the same direction. The cam lever 90 is designed to hold the dog free of the cam 84 until it passes the notch 85 and can ride on the surface of the cam without obstruction.

*Skip mechanism*

Figure 5:
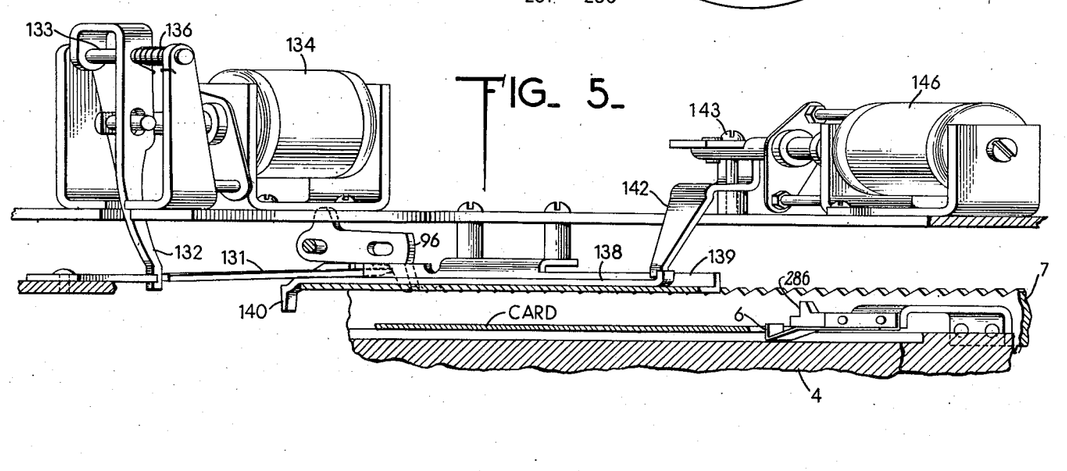
Fig. 5 is a perspective view of a portion of the mechanism controlling the feeding of cards.

Sometimes it is necessary that the rack be advanced so as to move a card several columns relative to the punch pins. In order that this may be accomplished, there is provided a skip bar 130 (Figs. 10 and 11) extending longitudinally of the rack 7 and fixed for movement therewith. A so-called "skip" lifter 131 (Figs. 5 and 11) extends under the stepping pawl 96 and is provided with the usual tapered end which coacts with the skip bar for holding the stepping pawl raised when high or intermediate portions of the bar are in line with the lifter. A lever 132 is pivotally supported at 133 and is operatively connected to the skip lifter 131 and to the plunger of a solenoid 134 (Figs. 2 and 5). When the solenoid 134 is energized, the lever 132 operates to move the skip lifter toward the bar 130.

To cause skipping at an intermediate level of the skip bar, a skip key may be operated to complete circuits, as will be described later, for energizing the solenoid 106 to lift the stepping pawl 96 and energizing the solenoid 134 to move the thicker portion of the skip lifter under the stepping pawl. A release of the skip key deenergizes the solenoid 106 but the solenoid 134 remains energized until the stepping pawl again engages the rack 7. The intermediate portion of the rack and the thicker portion of the skip lifter operate to hold the stepping pawl raised until a low portion 130a of the bar moves under the lifter and permits the same to drop for engaging the pawl 96 with the rack. The solenoid 134 is then deenergized and the skip lifter is moved away from the skip bar by a spring 136 until only its thin end portion lies under the stepping pawl. If this solenoid 106 is energized again to lift the stepping pawl for effecting a spacing operation and a high portion 130b on the bar moves into line with the skip lifter because of such spacing, the thin end portion of the skip lifter riding over the high bar portion is sufficient to hold the stepping pawl raised and effect a skipping operation until another low portion comes under the skip lifter.

In order that the rack 7 may be moved from any position to the point at which the last card column is presented to the punch pins 12, there is provided, as shown in Fig. 5, a member 138 which is slidably supported by a guide plate 139 in a position beneath the skip lifter 131. A bent portion 140 at one end of the member 138 is adapted to ride upon the guide plate 139 and operate the skip lifter 131 for holding the pawl 96 in a raised position out of engagement with the rack 7 so that the latter may be moved to its extreme left-hand position. For actuating the member 138, there is provided a lever 142 pivotally supported at 143 and operatively connected to the plunger of a solenoid 146. An energizing of the solenoid results in a moving of the member 138 over the guide plate 139 so as to actuate the skip lifter 131 for holding the pawl 96 in a raised position. The solenoid 106 is energized with the solenoid 146 so that the stepping pawl is lifted by the solenoid 106 and is then held raised by the skip lifter.

Punching mechanism

For actuating the punch pins 12, there is provided, as shown in Fig. 3, a cam 150 rotatably supported by the frame of the punching machine and continuously driven by the motor 26 (Fig. 2) through a belt 151 and a pulley 152. Each of the card columns has twelve index points at which one or more holes may be punched by the pins 12. There are, therefore, provided twelve pins which are guided by a block 154 in line with the index points and are normally held in their raised positions by springs 156. A yoke 157 is connected to each of the pins 12 and is engageable with the cam 150 so that the pin is positively moved to its raised position after it has been actuated to punch a hole in a card. Arranged beneath the cam 150 in line with the punch pins are members 159 which are yieldingly supported in engagement with the cam by springs 160. The mass of each of the members 159 and the stiffness coefficient of its spring 160 are such as to produce a natural frequency somewhat greater than the rotational speed of the cam so that the member 159 follows the cam without bounce.

Extending transversely of the pins 12 are bars or interposers 164 having reduced end portions which normally rest upon the pins beneath the members 159. A magnet M1 is operatively connected to the interposer 164 in Fig. 3 for moving it to the left against the action of a spring 166 so that an enlarged portion of the bar lies between the pin 12 and the member 159. The next adjacent interposer 164 is operatively connected to a magnet M2 which positions it relative to its punch pin 12. Magnets for the other punch pins are staggered in a similar manner to conserve space. Connected to the yoke 157 for each of the punch pins arranged in positions to punch holes in the cards at index points 1 to 9 is an insulating member 168 which operatively engages one of a pair of contacts 169 so as to move it to a closed position when the punch pin is actuated a predetermined distance in a hole punching direction. Each of the yokes for the punch pins arranged in positions to punch holes at the index points 10, 11 and 12 carries a similar insulating member which is engageable with one of a pair of contacts 170 (Fig. 17c) for moving it to a closed position upon actuation of the pin a predetermined distance in a punching direction.

Commutator

The moving of the interposers 164 to positions between the punch pins and the members 159 can take place only when the cam 150 is within a predetermined range of angular positions. In order that the magnets M may be energized at the proper time for moving the interposers to their punching positions, there is provided a commutator 172 (Figs. 10 and 12) which is fixed for rotation with the cam 150. The commutator 172 has a conducting member 174 which is engaged continuously by a brush 175. At one side of the member 174 is a projecting portion 177 fitting within a recess in an insulating member 178, and projecting from the other side of the member 174 is a portion 180 which fits within a recess in an insulating member 181. The portion 177 is engageable by a brush 184 through 90° of rotation, and the portion 180 is engageable by a brush 185 through 180° of rotation.

The cam 150 is rotated in a counter-clockwise direction in Fig. 3 and it is assumed that the cam is in its 90° position when its high point is farthest from the member 159. The projecting portion 177 and the brush 184 are so arranged that the brush first engages this portion when the cam reaches its 285° position, and engagement is maintained until the cam reaches its 15° position. The projecting portion 180 and the brush 185 are so arranged that the brush first engages this portion when the cam reaches its 330° position, and the engagement is maintained until the cam reaches its 150° position. The operation of the commutator to control the energizing of the magnets M will be discussed in connection with the wiring diagram.

Keyboard

Energizing of the various magnets and solenoids is initiated by manual operation of keys 190 (Figs. 1 and 9) which are marked with numerals and letters in accordance with the standard keyboard arrangement. There are also provided three additional keys 190S, 190R and 190T identified as the skip, release and stacker keys, respectively. Each of the keys is connected to a lever 191 pivotally supported at 192 and operatively engaging a bail 193 having an upwardly extending arm 194 which is adapted to close a pair of contacts 195. A link 196 connects the lever 191, shown in Fig. 9, to a pivoted member 197 for effecting engagement of contacts 198 carried by three conducting blades 199, upon actuation of the key. A link 200 connects the next adjacent lever 191 to a similar pivoted member 197 for closing other contacts 198, as shown. The sets of contacts controlled by the other adjacent levers are staggered in a similar manner. A space bar 202 is connected to a lever 203 which operates through a link 204 for closing a pair of contacts 205 when the bar is depressed.

Master card sensing mechanism

Figure 4:
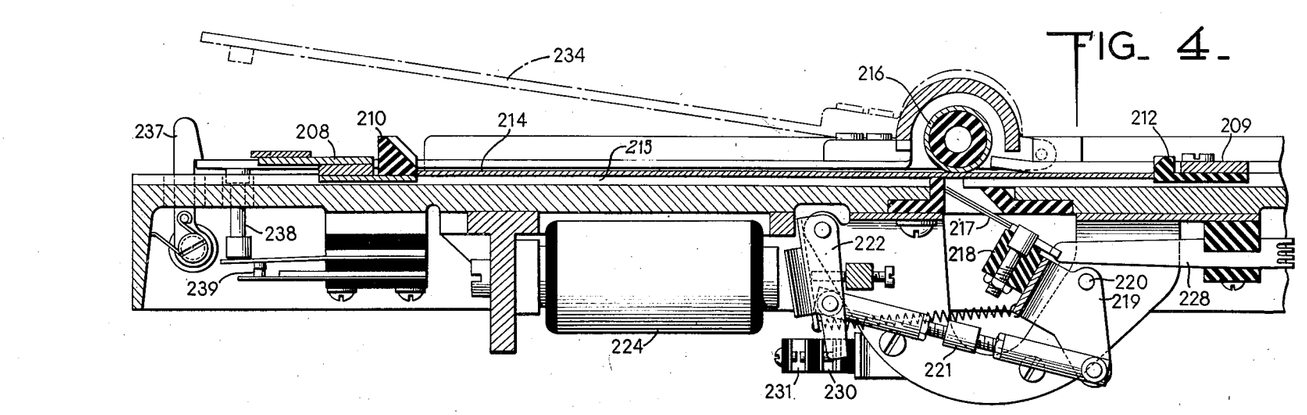
Fig. 4 is an enlarged vertical sectional view taken on the plane of the line 4—4 of Fig. 1.

At times it is desired that the energizing of the interposer magnets be effected automatically by the sensing of perforations in a master card. Fixed to the rack 7 are laterally projecting arms 208 and 209 (Figs. 1 and 4) carrying members 210 and 212 between which the master card 214 is arranged for movement over the surface of a plate 215. A contact member 216 is rotatably supported in engagement with the upper side of the master card, and brushes 217 are supported by an insulating block 218 in positions beneath the card, as shown. Twelve brushes 217 are provided, one for each index point in a card column, and these brushes are adapted to sense perforations in a column of the master card when the corresponding column on the card to be punched is located under the punch pins. The block 218 is connected to a member 219 pivotally supported at 220 and connected by a link 221 to the armature 222 of a magnet 224. The brushes 217 make contact with the member 216 through holes in the card when they are raised to their upper positions by a rocking of the member 219 in a clockwise direction. Conducting members 228 are supported in line with the brushes 217 and have continuous engagement with the brushes. Arranged adjacent to the armature 222 is a pair of normally closed contacts 230 and a pair of normally open contacts 231. Upon energization of the magnet 224, the armature 222 is operated to raise the brushes 217 into engagement with the master card and to open the contacts 230 while closing the contacts 231. Pivotally supported adjacent the contact member 216 is a bar 234 which is normally held in a raised position by a spring, not shown. To operate the machine automatically under the control of the master card, the bar 234 must be moved to its lowered position where it is held by a latch 237. With the bar 234 in its lowered position, a pin 238 of insulating material is positioned to close a pair of contacts 239 which are connected in a circuit including the magnet 224.

*Last column contacts.*—Attached to the rack 7 (Fig. 15) is a projecting member 244 which operates when the rack is in its last column position to rock a lever 245 and close a pair of so-called "last column" contacts 246.

Circuit diagram

The coordination of the various mechanisms described will now be made clear in a discussion of the wiring diagram of Figs. 17a, 17b and 17c. A number of relays are shown in these figures and each is identified by the letter R. The contacts controlled by the relays are given the same reference characters as the relays, followed by a lower case letter. Thus, R1 represents a relay, and R1a, R1b, etc., represent contacts operated thereby. To avoid cross-wiring, the contacts are located, in many cases, at points remote from their controlling relays. In such cases, the relays are shown dotted adjacent the contacts.

Some of the relays are of the type having multiple windings on a common core, and, to simplify the connections, the windings may be shown separated. The letter P or H is placed adjacent these windings to indicate whether it is a so-called pick-up or holding winding. Each of these relays is initially energized through its pick-up winding to close contacts which complete a circuit through its holding winding to maintain the contacts closed.

The interposer magnets M1 to M12 position interposers 164 to effect punching of the cards at corresponding numbered index points, and relays R1 to R12 control circuits to the corresponding numbered interposer magnets. A digit is recorded on a card by perforating it at the corresponding digital index point, and an alphabetic character is recorded by perforating the card at one of the index points 1 to 9, as well as at one of the so-called "zone" positions 10, 11 and 12. The complete coding arrangement for the alphabet is as given in the following table where the numerals following the letter indicate the index point positions that are perforated to represent that letter.

A, 12—1     N, 11—5
B, 12—2     O, 11—6
C, 12—3     P, 11—7
D, 12—4     Q, 11—8
E, 12—5     R, 11—9
F, 12—6     S, 10—2
G, 12—7     T, 10—3
H, 12—8     U, 10—4
I, 12—9     V, 10—5
J, 11—1     W, 10—6
K, 11—2     X, 10—7
L, 11—3     Y, 10—8
M, 11—4     Z, 10—9

Figure 17A:
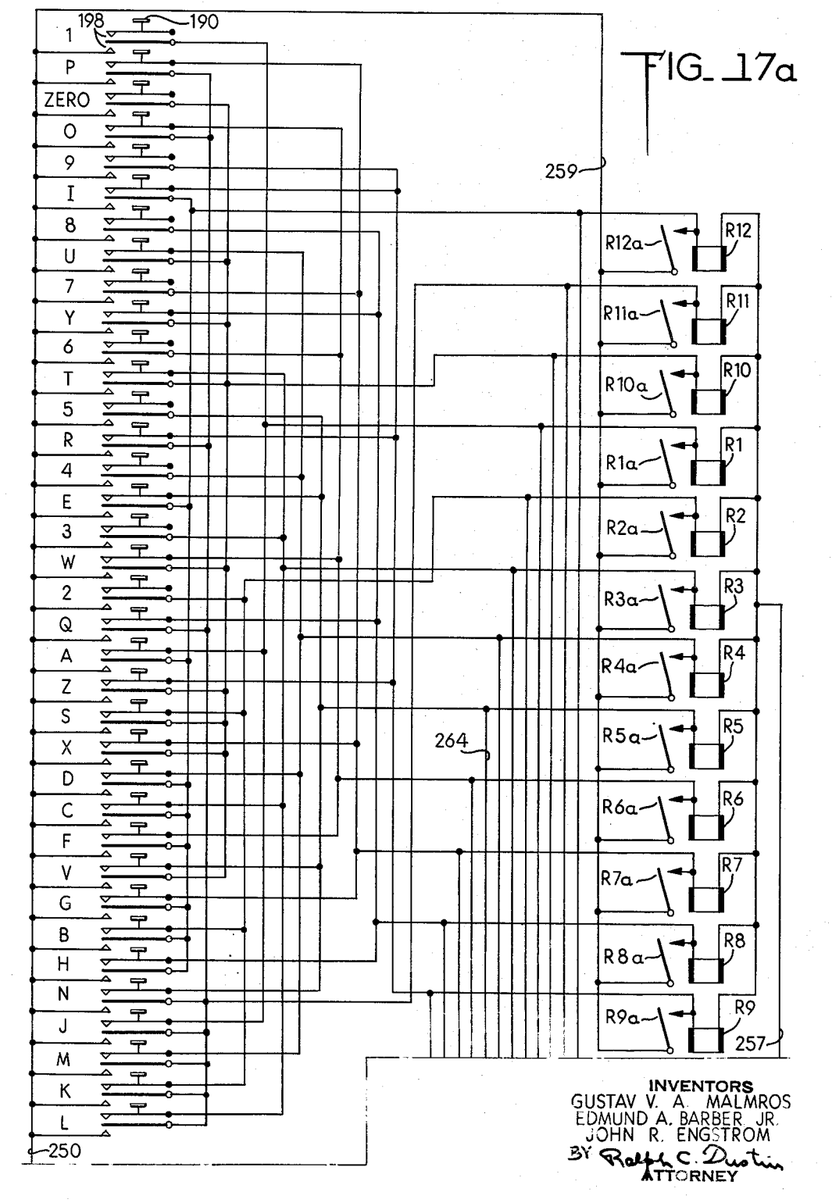
Figs. 17a, 17b and 17c, taken together, and arranged end to end, constitute a wiring diagram for the punching machine.
Figure 17B:
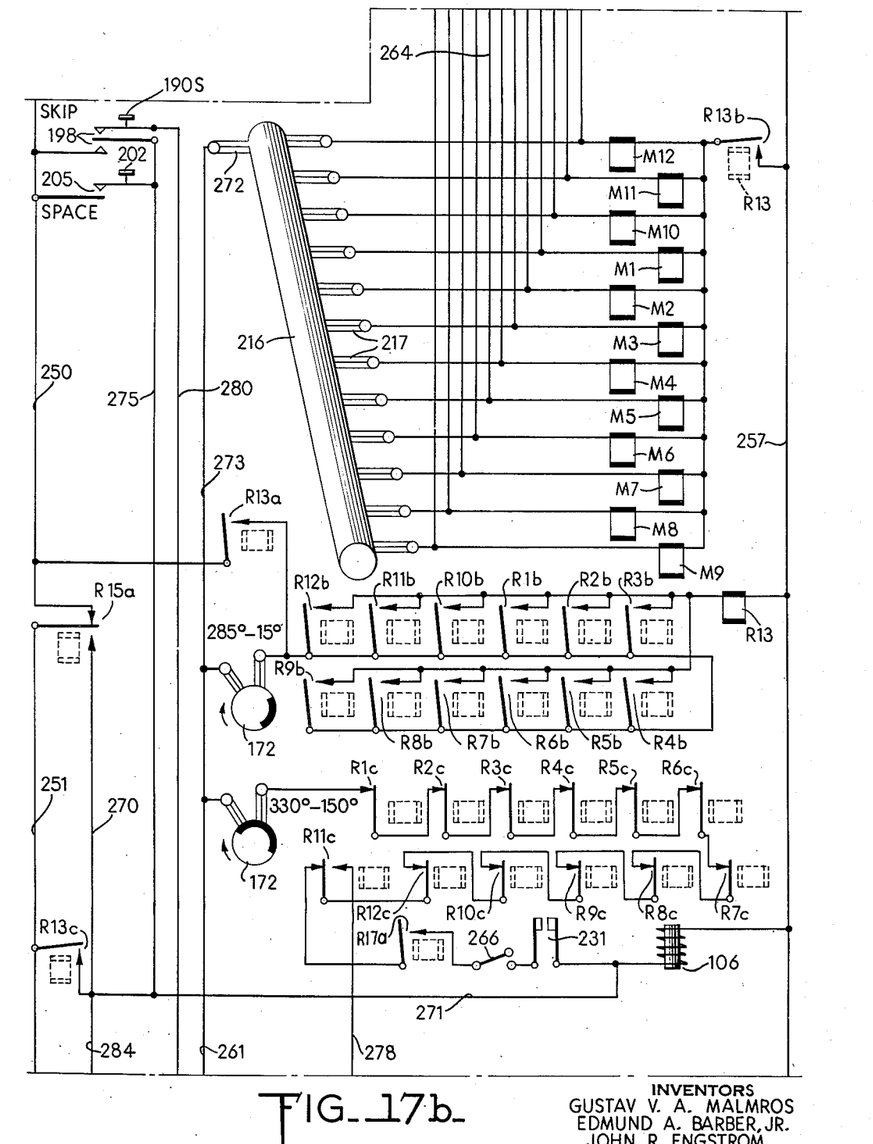
Figure 17C:
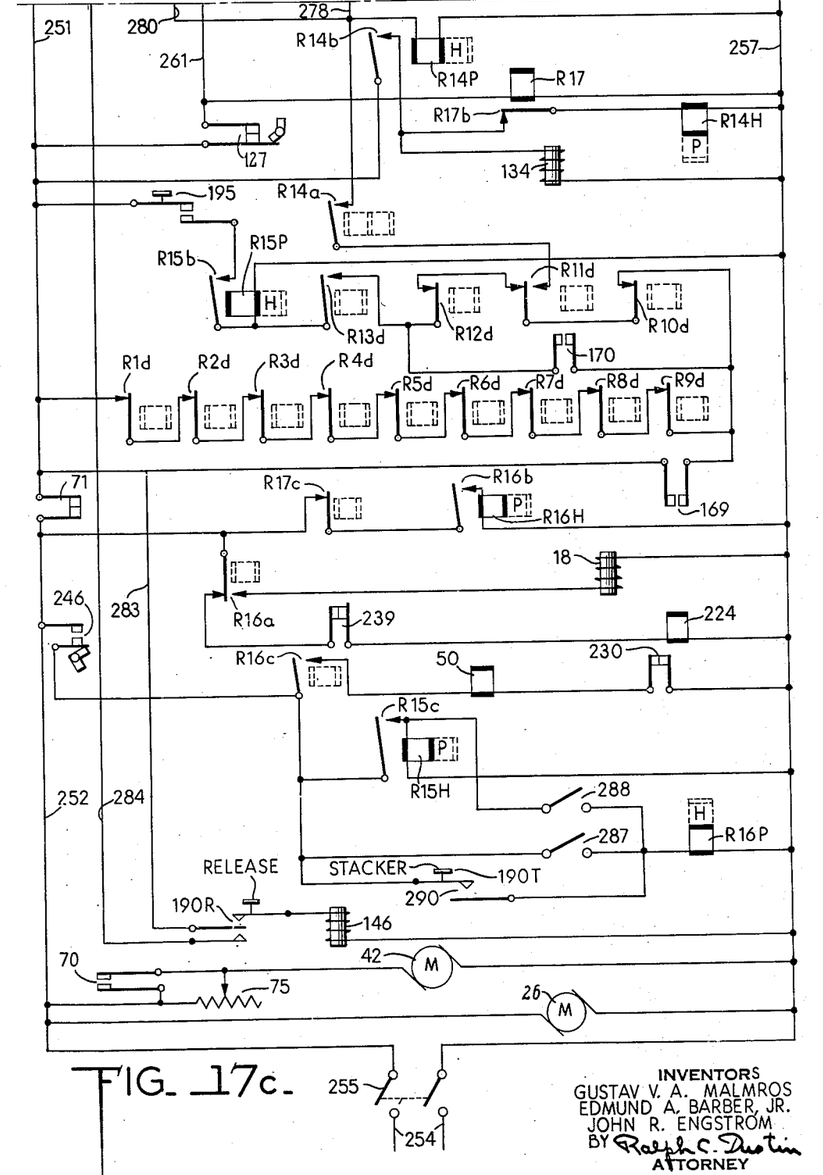

As shown in Fig. 17a, the lower blade of the contacts 198 for each key 190 is connected to a common conductor 250 which communicates through normally closed contacts R15a (Fig. 17b) with a conductor 251. Referring to Fig. 17c, it will be noted that the conductor 251 is connected through normally closed contacts 71 (Fig. 7) to a conductor 252 which may be connected to one side of a power line 254 through a manually operated switch 255. The middle blades for the contacts 198 of the alphabetic keys are connected to one of the relays R10, R11 or R12, while the upper blades for these contacts are connected to one of the relays R1 to R9. The middle blades for the contacts 198 of the numerical keys are connected to the corresponding numbered relays R1 to R9, and no connection is made to the upper blades of these contacts. The relays R1 to R12 are connected to a conductor 257 which may be connected to the power line 254 through the switch 255.

When the magnet 50 in Fig. 6 is energized, its armature operates to release the dog for engagement with the ratchet 43, and the lever 68 is released so that the contacts 70 close and provide a circuit from the power line through the conductor 252, the contacts 70, the motor 42 and the conductor 257 to the power line. The contacts 71 open at the same time to prevent energization of the reading and punching circuits during the card feeding operation. The motor then operates at a high speed to move the picker to the left and the card rack 7 to the right until the card is positioned between the card pusher 6 and the front card stop 8. When the card is so positioned, the finger 78 operates the lever 68 to open the contacts 70 and to close the contacts 71. The motor 42 is then energized through the resistance 75 and operates at a slow speed to return the picker to a position for engaging another card. With the contacts 71 closed, the keys 190 may be operated to effect an energizing of the interposer magnets M and the spacing solenoid 106.

*Numerical punching.*—For purposes of explanation, it will be assumed that the #5 key is operated to close its contacts 198. With the contacts for this key closed, a circuit is completed from the power line 254 through the switch 255, the conductor 252, the contacts 71, the conductor 251, the normally closed contacts R15a, the conductor 250, the contacts 198 for key #5, the relay R5 and the conductor 257 to the other side of the power line. Energizing of the relay R5 results in a closing of its contacts R5a to complete a circuit from the common conductor 250 through a conductor 259 and the winding of the relay R5 for maintaining it energized. Contacts R5b (Fig. 17b) are closed simultaneously with the closing of the contacts R5a so that a circuit may be completed from the conductor 251 through the contacts 127 (Fig. 17c), a conductor 261, the 285°–15° portion of the commutator 172, the contacts R5b, and a control relay R13 to the conductor 257. If the contacts R5b are closed before the 285°–15° commutator connection is completed, then the relay R13 is first energized when the 285° position is reached. A closing of the contacts R5b at a time after the 285°–15° commutator connection is completed results in an energizing of the relay R13 simultaneously with the closing of the contacts R5b. The timing diagram of Fig. 16 indicates the operation when the relay R5 picks up simultaneously with the completion of the circuit through the 285°–15° commutator. The relay R13 picks up 70° after it is energized. This means that a picking up of the relay R13 cannot take place until the next machine cycle if the contacts R5b close more than 20° after the connection is completed by the 285°–15° commutator.

Energizing of the relay R13 results in a closing of its contacts R13a to complete a circuit from the conductor 250 through contacts R13a, the contacts R5b, and the relay R13 for maintaining the latter energized. Contacts R13b (Fig. 17b) are closed at the same time to complete a circuit from the conductor 250 through the conductor 259 (Fig. 17a), the contacts R5a, a conductor 264, the interposer magnet M5 and the relay contacts R13b to the conductor 257. As shown in the timing diagram, the magnet M5 has its interposer positioned for punching 120° after the relay R13 picks up, the high point of the cam 150 then being in its 115° position. The latest at which an interposer may be moved by its magnet to a punching position is when the high point of the cam is in its 135° position.

Figures 15, 16:
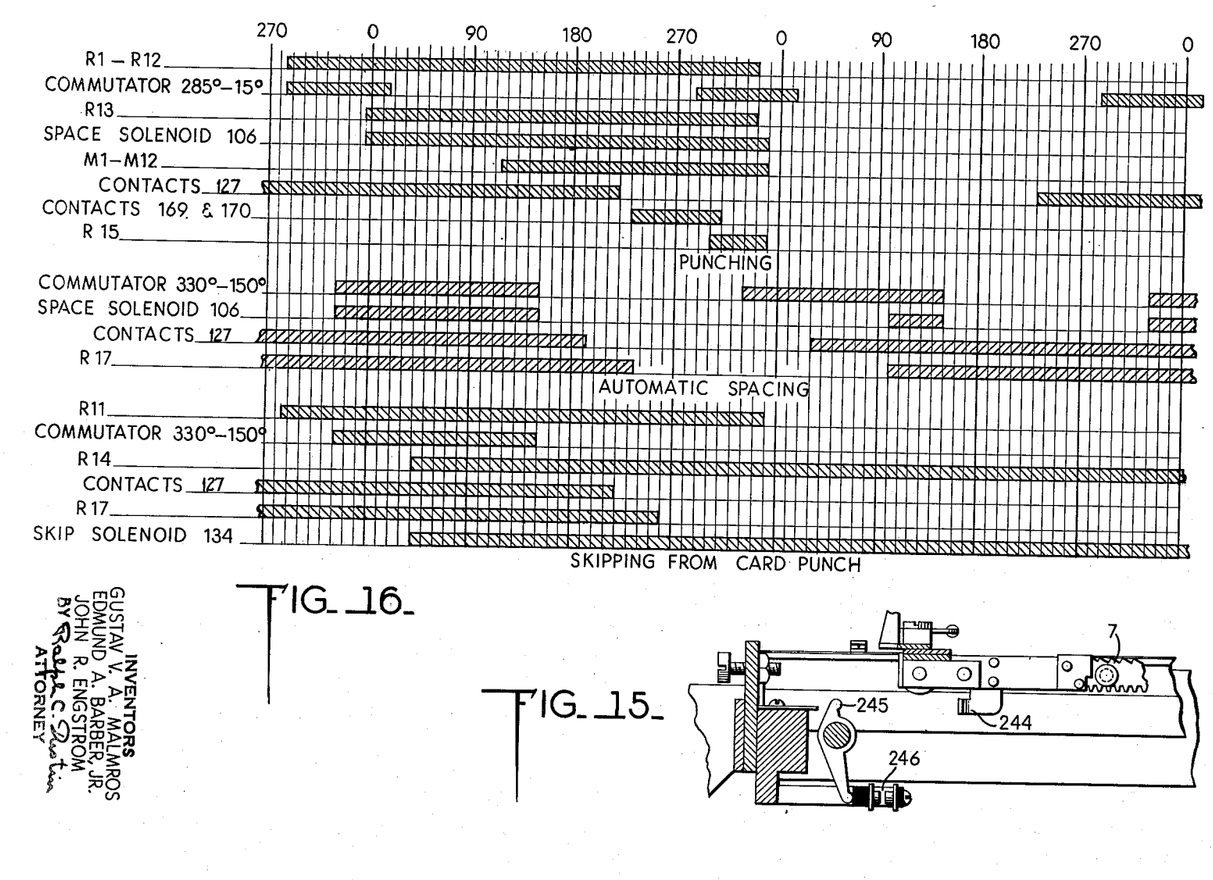
Fig. 15 is an enlarged vertical sectional view taken along the line 15—15 of Fig. 1 and showing the last column contacts and the mechanism for operating them.
Fig. 16 is a time chart showing the operation of the various contacts for controlling electrical circuits.

Relays contacts R13c (Fig. 17b) close at 355°, this being the point at which the relay R13 picks up in the timing diagram, and complete a circuit through the spacing solenoid 106. This solenoid lifts the stepping pawl 96 so that it is advanced by the spring 124 to effect an opening of the contacts 127 225° after the solenoid 106 is first energized. The interposer for the magnet M5 is actuated by the cam 150 to operate the punch pin 12 for punching the card at its #5 index position. Just before the punch pin has completed its downward stroke but after it has penetrated the card, the contacts 169 (Fig. 17c) are closed to complete a circuit from the conductor 251 through the contacts 169, the contacts R10d, the normally closed contacts R11d, the contacts R12d, the contacts R13d which are now closed because the relay R13 is energized, and the pick-up coil for relay R15 to the conductor 257. Closing of the contacts 169 takes place, as shown in Fig. 16, when the high point of the cam is in its 230° position.

The relay R15 operates 70° after it is energized by the closing of the contacts 169 to close the normally open contacts R15a and complete a circuit from the conductor 251 through the normally open contacts R15a, a conductor 270, a conductor 271 and the solenoid 106 to the conductor 257. The normally closed contacts R15a are opened to deenergize the relays R5 and R13. Relay contacts R5a then move to their open position at 340° for breaking the holding circuit to relay R5, and the contacts R13a open at the same time to break the holding circuit for relay R13. Contacts R5b open to prevent an energizing of the relay R13 through the commutator 285°–15°, and the contacts R13b also open to prevent an energizing of the interposer magnets until circuits are again established by an operation of one of the keys 190. Contacts R13c open so that the solenoid 106 is energized only through the normally open contacts R15a, and contacts R13d open to break the circuit through the relay R15 and effect a return of the contacts R15a to their normal positions for deenergizing the solenoid 106. The provision of a circuit through the normally open contacts R15a until the relay R15 is deenergized by the opening of contacts R13d is sufficient to maintain the solenoid 106 energized until the punch pin is withdrawn from the card. The deenergizing of the solenoid 106 to effect an operation of the escapement mechanism for advancing the card to the next column takes place at 350°, and the contacts 127 close on the completion of escapement 240° after the solenoid is deenergized. The commutator 285°–15° has already moved through its second closed period and so circuits cannot be established again to effect punching until the third cycle is reached. The interposer magnet M5 is deenergized 50° after the relay R15 picks up its contacts, and the interposer is returned to its normal position by the spring 166.

Each time that a key is operated, the bail contacts 195 (Fig. 9) are closed. These contacts are connected, as shown in Fig. 17c, in a circuit from the conductor 251 to normally open contacts R15b. If a key is held down by the operator, a circuit is provided from the conductor 251 through the contacts 195, the contacts R15b after they are closed by an energizing of relay R15 through contacts R13d, and the winding of relay R15 to the conductor 257. The normally open contacts R15a are then held closed to maintain the solenoid 106 energized and prevent an operation of the escapement mechanism to advance the card. The normally closed contacts R15a are also held open so that the relays R1 to R12 cannot be energized to set up circuits for advancing interposers to punching positions.

It will be noted that contacts R1c to R12c are connected in a circuit with the commutator portion 330°–150° to prevent a completion of this circuit during numerical or alphabetical punching. Contacts R1d to R9d (Fig. 17c) are connected in parallel with the contacts 169 and operate during numerical and alphabetical punching so that an energizing of the relay R15 can take place only through the contacts 169.

*Alphabetic punching.*—For purposes of explanation, it will be assumed that the key for the letter A is operated to effect a punching of the card. It will be noted that the middle blade for the contacts 198 of the key A is connected to the R12 relay and that a circuit is completed from the conductor 250 through the middle blade and the R12 relay to the conductor 257 when the A key is operated. The upper blade of the contacts 198 is connected to the relay R1, and this relay is energized by a circuit extending from the conductor 250 through the contacts 198, the upper blade, and the relay R1 to the conductor 257. Contacts R1a and R12a are both closed to complete holding circuits through the relays R1 and R12, and the contacts R1b and R12b are closed so that the relay R13 is energized when the connection is made at the 285°–15° commutator. A holding circuit is established for the relay R13 by a closing of the contacts R13a, and circuits are provided for the interposer magnets M1 and M12 by a closing of the relay contacts R13b. Interposers for the magnets M1 and M12 are both moved to positions to effect an operation of the punch pins at the #1 and #12 index points by the cam 150. As the punch pins are moved toward the card, the contacts 169 and 170 are both closed to complete a circuit from the conductor 251 through the contacts 169, contacts 170, the contacts R13d and the relay R15 to the conductor 257. Energizing of the relay R15 then effects a closing of the normally open contacts R15a for maintaining the solenoid 106 energized until the punch pins are removed from the card, and an opening of the normally closed contacts R15a for deenergizing the relays R1, R12 and R13. The solenoid 106 is first energized through the contacts R13c the same as in numerical punching.

*Punching from duplicator.*—To punch holes under the control of the duplicating mechanism, a master card 214 (Fig. 4) is arranged between the members 210 and 212 for movement between the contact member 216 and the brushes 217. The bar 234 is moved to its lowered position where it is held by the latch 237, and the contacts 239 are held closed through the pin 238 to establish a circuit from the conductor 252 (Fig. 17c) through normally closed contacts R16a, the contacts 239 and the brush magnet 224 for raising the brushes into engagement with the lower side of the master card. The energizing of the relays R1 to R12 and the interposers M1 to M12 then takes place through circuits which are established on the sensing of holes in the cards by the brushes. As shown in Fig. 17b, the contact member 216 is connected through a brush 272, a conductor 273, the conductor 261 and the contacts 127 to the conductor 251. When a hole is sensed at one of the index positions 1 to 12, a circuit is completed from the brush 272 through the contact member 216, the brush 217 sensing the hole, and the corresponding numbered relay R1 to R12 to the conductor 257. An energization of this relay results in a completion of circuits for energizing the interposer magnets and the spacing solenoid in a manner similar to that described above in connection with the operation of the numerical and alphabetic keys.

*Spacing by space key.*—If it is desired to advance the card one space without punching, the bar 202 may be operated to close contacts 205 and complete a circuit from the conductor 258 through the contacts 205 (Fig. 17b), a conductor 275, the conductor 271 and the spacing solenoid 106 to the conductor 257. The energizing of the solenoid 106 causes the stepping pawl 96 to be lifted so that it is advanced by the spring 124 to a position for engagement by the next tooth 99 on the rack 7. When the bar is released, the solenoid 106 is deenergized to effect a lifting of the holding pawl 93 and a dropping of the stepping pawl 96 for engagement with the next tooth on the rack as it is advanced by the yielding means.

*Automatic spacing when duplicating.*—When punching is effected by circuits which are established through the sensing of holes in a master card, a spacing of the card takes place when no hole is sensed in a column of the master card. As the card is advanced to position one of its columns under the punch pins, the contacts 127 are closed and a circuit is completed from the conductor 251 through the contacts 127 and a relay R17 (Fig. 17c) to the conductor 257. Relay contacts R17a (Fig. 17b) are then closed to provide a circuit which is controlled by the commutator portion 330°–150°. A manually operated switch 266 (Figs. 1 and 17b) is connected in this circuit and is moved to its closed position. The contacts 231 (Fig. 4) are also connected in this circuit, and these contacts are closed since the magnet 224 is energized while duplicating. If a hole is sensed in the card, then one of the relays R1 to R12 is energized and its contacts R1c to R12c are opened to prevent a circuit from being established through the commutator 330°–150°. If no hole is sensed before the commutator 330°–150° reaches its closed position, a circuit is completed from the conductor 261 through the commutator, the contacts R1c to R10c, the contacts R12c, the normally closed contacts R11c, the contacts R17a, the switch 266, the contacts 231 and the solenoid 106 to the conductor 257. The solenoid 106 is then energized, as indicated in Fig. 16 under automatic spacing, simultaneously with the closing of the circuit by the commutator 330°–150°. This results in a lifting of the stepping pawl and an opening of the contacts 127 225° later to break the circuit through the relay R17. The solenoid 106 is deenergized when its circuit is broken by the commutator 330–150°, and the contacts R17a in this circuit open 40° after the contacts 127 open. Upon a deenergizing of the solenoid, the escapement mechanism operates to advance the card to the next column and effect a closing of the contacts 127. These contacts close 240° after the solenoid is deenergized and complete the circuit through the relay R17 which picks up 70° later. The closing of the contacts 127 takes place in the second cycle 60° after a connection is made between the brushes of the commutator 330°–150°; and, since the contacts R17a do not close until 70° later, the circuit through the solenoid 106 in the second cycle is completed 130° after the connection through the 330°–150° commutator is made. The solenoid is energized during only 50° of operation before the circuit is broken by the commutator, and this period is insufficient to lift the stepping pawl from the rack 7. Automatic spacing for the next column cannot take place until the third cycle, so that the machine spaces at the same rate that it punches.

*Skipping from punched card.*—Skipping takes place when there is a hole in the master card at the #11 index position. As the hole is sensed by the brush 217, the relay R11 is energized to pick up its contacts, and the relay R13 is energized in the normal manner. In addition, a skip relay R14 (Fig. 17c) is energized by a circuit from the conductor 251 through the contacts 127, the conductor 261, the commutator 330°–150°, the contacts R1c to R12c, the normally open contacts R11c, a conductor 278 and the relay R14 to the conductor 257. Contacts R14a (Fig. 17c) are closed 70° after contact is made through the commutator and establish another circuit for energizing the pick-up coil of the skip relay, this circuit extending from the conductor 251 through the contacts R1d to R10d, the normally open contacts R11d, the contacts R14a and the relay R14 to the conductor 257. This circuit maintains the pick-up coil of R14 energized after the commutator 330°–150° moves to its open position.

The space solenoid 106 is energized the same as in punching, and it lifts the stepping pawl and effects an opening of the contacts 127 225° later. Contacts R14b (Fig. 17c) close after the relay R14 is energized and complete a circuit from the conductor 251 through the contacts R14b and the skip solenoid 134 (Fig. 5) to the conductor 257 for moving the skip lifter 131 over the skip bar to a position for holding the stepping pawl raised. Connected in parallel with the skip solenoid is a circuit including normally closed contacts R17b and a holding coil for the relay R14. Since relay R17 is connected in a circuit with the contacts 127, this relay will be deenergized upon the opening of these contacts and effect a closing of the contacts R17b for energizing the holding coil of the relay R14.

The interposer magnet M11 is picked up as in numerical and alphabetic punching to effect actuation of the #11 punch pin. As this pin is moved toward the card, the contacts 170 (Fig. 17c) are closed to complete the circuit from the conductor 251 through the contacts R1d to R9d, the contacts 170, the contacts R13d and the pick-up winding R15P to the conductor 257. The normally closed contacts R15a are opened to deenergize the relays R11 and R13. The normally open contacts R15a are closed to hold the space solenoid energized until the punch pin is removed from the card, but these contacts are then opened because the relay R15 is deenergized by the opening of contacts R13d. The contacts R13c open so that the space solenoid remains deenergized. Deenergizing of the relay R11 results in a moving of the contacts R11d to a position for breaking the circuit through the contacts R14a and the relay winding R14P, and the relay R14 is held up only by the circuit including the contacts R17b. The deenergizing of the space solenoid results in a lifting of the holding pawl, and the stepping pawl is held in its raised position by the skip lifter. The rack 7 then advances until a low portion of the skip bar comes in line with the skip lifter, permitting the latter to drop so that the stepping pawl engages the rack 7. The contacts 127 then close and energize the relay R17 to open the contacts R17b and break the circuit through the winding R14H for returning the system to normal.

*Skipping from skip key.*—If it is desired to cause skipping when operating from the keys 190, the skip key 190S (Fig. 17b) is operated to complete two circuits, one leading from the middle blade of the contacts 198 for this skip key through the conductors 275, 271, and the space solenoid 106 to the conductor 257, and the second leading from the upper blade through a conductor 280 and the relay winding R14P to the conductor 257. The space solenoid picks up the stepping pawl and opens the contacts 127 to deenergize the relay R17 and effect a closing of the contacts R17b for establishing a holding circuit through the winding R14H. The skip solenoid 134 is energized through the contacts R14b and moves the skip lifter 131 to a position for holding the stepping pawl raised. When the skip key is released, the space solenoid is deenergized and the holding pawl is lifted so that the card rack advances until a low point on the skip bar comes under the skip lifter.

*Release key operation.*—To advance the rack 7 so that the last column of the card is positioned under the punch pins, the release key 190R (Fig. 17c) is operated to complete a circuit from the conductor 251 through conductors 282, 283, 284, 271 and the space solenoid 106 to the conductor 257. Another circuit is completed at the same time from the conductor 283 through the release solenoid 146 (Fig. 5) to the conductor 257. The energizing of the space solenoid lifts the stepping pawl, and the energizing of the release solenoid 146 causes the member 138 to be moved over the guide plate 139 to a position for holding the stepping pawl raised. When the key 190R is released, the space solenoid is deenergized and the rack advances to the last column position. As this position is reached, a portion 286 (Fig. 5) of the bracket supporting the card pusher engages a depending portion of the member 138 and moves it to a position permitting the stepping pawl to engage the rack again.

*Ejection by eject switch.*—At times it is desirable to eject the card as soon as punching is completed in the next to the last column on the card. To accomplish this, a switch 287 (Figs. 1 and 17c) is closed so that the closing of the last column contacts 246 (Fig. 15) upon movement of the card to its last column position completes a circuit from the conductor 252 through the contacts 246, the switch 287 and an eject relay R16P to the conductor 257. The normally open contacts R16a are then closed to complete a circuit through the eject solenoid 18 (Fig. 2) for effecting a movement of the rollers 14 into engagement with the card to advance it to the hopper 21. Contacts R16b are closed to establish a holding circuit from the conductor 252 through contacts R17c, contacts R16b and the winding R16H to the conductor 257. Contacts R16c are closed to energize the trip magnet 50 through a circuit from the conductor 252 through the last column contacts 246, the contacts R16c, the trip magnet 50, and the brush contacts 230 (Fig. 4) to the conductor 257. The contacts 230 are closed only when the reading brushes 217 are lowered and prevent movement of the rack 7 in a direction to receive another card while the brushes are raised. Energizing of the trip magnet 50 releases the dog 45 (Fig. 6) for engagement with the ratchet 43 to return the rack 7 to its card receiving position. As soon as the rack moves out of the last column position, the contacts 246 open and deenergize the trip magnet 50 and the winding R16P of the eject relay. The armature 51 of the trip magnet then moves to a position to engage the end of the dog 45 after one rotation of the ratchet 43 is completed for breaking the drive connection to the motor 42. Energizing of the trip magnet 50 also effects an opening of the contacts 71 so that the relay R17 is deenergized and its contacts R17c are closed to maintain the holding circuit for the eject relay winding R16H. As the rack 7 is returned, the stepping pawl is held in a position for opening the contacts 127. When the rack is fully returned, the stepping pawl engages the rack teeth 99 and is moved by the latter to a position for closing the contacts 127. The latch contacts 71 are closed at approximately the same time by the finger 78, and the relay R17 is then energized to open the contacts R17c and break the holding circuit for the relay R16.

*Ejection after punching in last column*—To eject the card after punching in its last column, the switch 287 is opened and a switch 288 (Figs. 1 and 17c) is closed. As the punching operation in the last column is completed, the relay R15 picks up as described above, and the relay contacts R15c (Fig. 17c) are closed. The last column contacts 246 were closed as soon as the card was moved to a position for punching in its last column, and the closing of the contacts R15c completed a holding circuit from the conductor 252 through the contacts 246, the contacts R15c and the winding R15H to the conductor 257. Another circuit is established through the contacts R15c, the switch 288 and the eject relay pick-up winding R16P. The contacts controlled by the relay R16 are then picked up to energize the eject solenoid 13 and the trip magnet 50, as described above.

*Ejection from stacker key*—With the switches 287 and 288 open, ejection of the card from its last column position must be accomplished by operating the stacker key 190T (Figs. 1 and 17c) to complete a circuit from the last column contacts 246 through contacts 290 and the pick-up winding R16P of the eject relay. This relay then picks up its contacts to energize the eject solenoid 13 and the trip magnet 50, as described above.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. In a card punching machine, a set of punches, means for actuating said punches including a continuously rotating cam, pins reciprocably supported in positions to be acted upon by said cam, means for yieldingly holding said pins in engagement with said cam, elements movable to positions between said pins and said punches for transmitting motion to the latter from said pins, electrically operated means for moving said elements selectively to positions between said pins and said punches, and means including a commutator rotating with said cam for controlling the energizing of said electrically operated means.

2. The invention set forth in claim 1 in which the mass of each of said pins and the stiffness coefficient of its yieldable holding means gives to the pin a natural frequency greater than the rotational speed of the cam by such an amount that the pin remains in continuous engagement with the cam.

3. In a card punching machine, a set of punches, means for actuating said punches including a continuously rotating cam, pins reciprocably supported in positions to be acted upon by said cam, means for yieldingly holding said pins in engagement with said cam, elements movable to positions between said pins and said punches for transmitting motion of the pins in one direction to said punches, means fixed to said punches and operatively engaging said cam for moving the punches in the opposite direction, electrically operated means for moving said elements selectively to positions between said pins and said punches, and means including a commutator rotating with said cam for controlling the energizing of said electrically operated means.

4. In a card punching machine, a punch pin, means operable for positioning a card step-by-step so as to present different points thereon successively to said punch pin, an interposer movable to a position for effecting operation of said punch pin, means including a continuously rotating cam for actuating said punch pin through said interposer when the latter is moved to its pin operating position, means for moving said interposer to its pin operating position, means operating in synchronism with said cam for controlling said interposer moving means, and means connected to said punch pin and operable on predetermined movement of the latter for effecting an operation of said card positioning means to advance the card one step.

5. In a card punching machine, a punch pin, an escapement mechanism operable for advancing a card step-by-step under said punch pin, a solenoid connected to said escapement mechanism and operable when energized and deenergized to actuate said escapement mechanism for advancing the card one step, an interposer movable to a position for effecting operation of said punch pin, means including a continuously rotating cam for actuating said punch pin through said interposer when the latter is moved to its pin operating position, means for moving said interposer to its pin operating position, means including a commutator rotating with said cam for controlling said interposer moving means, a circuit including a pair of normally open contacts for controlling the energizing of said solenoid, and means connected to said punch pin and operating on predetermined movement of the latter in a punching direction for closing said contacts.

6. In a card punching machine, a punch pin, means operable for positioning a card step-by-step so as to present different points thereon successively to said punch pin, an interposer movable to a position for effecting operation of said punch pin, means including a continuously operating member adapted to actuate said punch pin through said interposer when the latter is moved to its pin operating position, electrically operated means for moving said interposer to its pin operating position, means including a solenoid which is operable when both energized and deenergized for effecting an actuation of said card positioning means to advance the card one step, a relay having separate contacts for controlling the energizing of said electrically operated means and said solenoid, means operating in synchronism with said member for effecting an energizing of said relay, and means connected to said punch pin and operable on predetermined movement of the latter for effecting a deenergizing of said relay.

7. A machine for punching holes in one card in response to the sensing of holes in a second card comprising, in combination, a carriage for supporting both of said cards, a punch pin arranged to punch holes in said one card as said carriage is advanced, an interposer movable to a position for effecting operation of said punch pin, means including a continuously operating member adapted to actuate said punch pin through said interposer when the latter is moved to its pin operating position, electrically operated means for moving said interposer to its pin operating position, means for sensing holes in said second card as said carriage is advanced, means including a solenoid for advancing said carriage step by step so as to position said cards relative to said punch pin and said sensing means, means including a commutator operating in synchronism with said member for effecting an energizing of said electrically operated means and said solenoid when a hole is sensed in said second card, and a second commutator operating in synchronism with said member and effecting an energizing of said solenoid alone when no hole is sensed in said second card.

8. In a card punching machine, a set of punches, elements movable into operative engagement with said punches, means including a continuously operating member adapted to actuate said punches through said elements when the latter are in operative engagement with said punches, electrically operated means for moving said elements selectively into operative engagement with said punches, and means for controlling the energizing of said electrically operated means, said last mentioned means including a commutator connected to said member for operation in synchronism therewith.

GUSTAV V. A. MALMROS.
  EDMUND A. BARBER, Jr.
  JOHN R. ENGSTROM.

REFERENCES CITED

The following references are of record in the file of this patent:

UNITED STATES PATENTS

| Number | Name | Date |
|---|---|---|
| 575,497 | Storm | Jan. 19, 1897 |
| 1,878,930 | Lake | Sept. 20, 1932 |
| 1,976,618 | Lee et al. | Oct. 9, 1934 |
| 2,346,267 | Mills | Apr. 11, 1944 |
| 2,398,014 | Lake | Apr. 9, 1946 |